US010800198B2

(12) United States Patent
Mastalia

(10) Patent No.: US 10,800,198 B2
(45) Date of Patent: Oct. 13, 2020

(54) MODULAR AND PRODUCTION SYSTEM WITH HIGH FLEXIBILITY OF USE AND OPERATION, FOR COMBINED MANUFACTURING OF CUSTOMIZED PRINT, PAPER AND PAPERBOARD PROCESSING AND BINDING

(71) Applicant: Carmine Mastalia, Salerno (IT)

(72) Inventor: Carmine Mastalia, Salerno (IT)

( * ) Notice: Subject to any disclaimer, the term of this patent is extended or adjusted under 35 U.S.C. 154(b) by 288 days.

(21) Appl. No.: 15/749,985

(22) PCT Filed: Apr. 29, 2016

(86) PCT No.: PCT/IB2016/052445
§ 371 (c)(1),
(2) Date: Feb. 2, 2018

(87) PCT Pub. No.: WO2017/021788
PCT Pub. Date: Feb. 9, 2017

(65) Prior Publication Data
US 2018/0236805 A1    Aug. 23, 2018

(30) Foreign Application Priority Data

Aug. 4, 2015 (IT) .................. 102015000041934

(51) Int. Cl.
*B42C 9/00* (2006.01)
*B42C 19/00* (2006.01)
B41F 13/56 (2006.01)
(Continued)

(52) U.S. Cl.
CPC ............ *B42C 9/0081* (2013.01); *B41F 13/56* (2013.01); *B41F 19/007* (2013.01); *B42C 9/00* (2013.01);
(Continued)

(58) Field of Classification Search
CPC ......... B42C 9/0081; B42C 9/00; B42C 19/00; B42C 19/08; B41F 13/56; B41F 19/007; B65H 45/28
See application file for complete search history.

(56) References Cited

U.S. PATENT DOCUMENTS 5,080,337 A    1/1992 Mayer et al.
5,451,037 A *  9/1995 Lundstrom ............... B07C 1/00
                                                      270/1.03
(Continued)

FOREIGN PATENT DOCUMENTS

EP    2 269 823 A1    1/2011
JP    H11235887 A     8/1999
(Continued)

OTHER PUBLICATIONS

International Search Report, dated Sep. 21, 2016, from corresponding PCT/IB2016/052445 application.

*Primary Examiner* — Patrick H Mackey
(74) *Attorney, Agent, or Firm* — Nixon & Vanderhye

(57) ABSTRACT

A system for personalized printing, paper and paperboard processing, and binding to enable automatic management of simple, special, and mixed operations of paper and paperboard processing and binding, has the particular feature of being of a modular type and hence with high flexibility of use and operation in so far as into the system there may be inserted manufacturing machines or processing stations that can be allocated therein according to the desired modalities, number, and operating sequence, with the additional possibility of their being replaced with further machines different therefrom so as to obtain a system for personalized printing, paper and paperboard processing, and binding that is completely personalizable, with the maximum flexibility of use and operation according to the needs at the moment of production.

19 Claims, 2 Drawing Sheets

(51) Int. Cl.
*B41F 19/00* (2006.01)
*B42C 19/08* (2006.01)
*B65H 45/28* (2006.01)

(52) U.S. Cl.
CPC .............. *B42C 19/00* (2013.01); *B42C 19/08* (2013.01); *B65H 45/28* (2013.01); *B42P 2201/12* (2013.01); *B65H 2301/4311* (2013.01); *B65H 2301/5111* (2013.01)

(56) References Cited

U.S. PATENT DOCUMENTS

| | | | |
|---|---|---|---|
| 5,547,175 A | 8/1996 | Graushar et al. | |
| 6,347,260 B1* | 2/2002 | Graushar | B65H 39/02 270/1.02 |
| 6,386,771 B2* | 5/2002 | Haller | B43M 5/04 101/484 |
| 7,100,911 B2* | 9/2006 | Middelberg | B65H 39/06 271/9.01 |
| 7,325,375 B2* | 2/2008 | Graushar | B65H 39/06 270/1.02 |
| 8,528,890 B2* | 9/2013 | Graushar | B41F 13/56 270/1.02 |
| 2008/0172145 A1* | 7/2008 | Freyburger | B43M 3/02 700/233 |
| 2011/0037214 A1 | 2/2011 | Graushar et al. | |
| 2014/0030043 A1 | 1/2014 | Brown et al. | |
| 2015/0158322 A1 | 6/2015 | Kato | |

FOREIGN PATENT DOCUMENTS

| | | |
|---|---|---|
| JP | 2000-103194 A | 4/2000 |
| JP | 2001316999 A | 11/2001 |
| JP | 2001-353644 A | 12/2001 |
| JP | 2009-502668 A | 1/2009 |

\* cited by examiner

MODULAR AND PRODUCTION SYSTEM WITH HIGH FLEXIBILITY OF USE AND OPERATION, FOR COMBINED MANUFACTURING OF CUSTOMIZED PRINT, PAPER AND PAPERBOARD PROCESSING AND BINDING

BACKGROUND OF THE INVENTION

Field of the Invention

The present invention regards an innovative system for personalized printing, paper and paperboard processing, and binding of a modular type with high flexibility of use and operation.

The paper and paperboard processing industry and the packaging industry are manufacturing sectors that use the semi-finished products of the pulp and paper industry, and hence are located downstream of the pulp and paper industry itself, which is the manufacturing sector constituted by the paper companies that produce paper and paperboard as semi-finished products or media, for example, for printing, or packaging.

Description of the Related Art

Currently known are various patents regarding systems for printing, paper and paperboard processing, and binding.

In particular, the following may be mentioned: the US patent No. US2015158322 published on Jun. 11, 2015, the Japanese patent No. JP2001316999 published on Nov. 16, 2001, and the Japanese patent No. JPH11235887 published on Aug. 31, 1999.

The US patent No. US2015158322 concerns a system of post-processing apparatuses for carrying out operations of paper and paperboard processing, and binding on a sheet provided with a pre-printed image. The post-processing basically consists in binding the corresponding case using an apparatus that comprises a particular application paste, as well as being equipped with a member for applying the paste itself by applying a pressing action. The system is likewise equipped with a control device configured for receiving information regarding any discrepancy detected as compared to a basic processing and operating setting.

The Japanese patent No. JP2001316999 concerns a system of paper and paperboard processing, and binding that solves the problem of obtaining paper pages for books with excellent characteristics of image and machineability with operations carried out on both sides of the pages themselves, using an electrophotographic printer and devices presenting excellent versatility in cutting the paper itself after printing thereof, completing the operation with a binding process. The paper, at the end of the production cycle, has a weight percentage of the filler content comprised between 10 wt % and 20 wt %, an opacity higher than 85%, a water content in the paper at the end of manufacture ranging from 3 wt % to 6 wt %, an electrical surface resistance of the paper comprised between $10^{10}$ and $10^{12} \Omega$ with a period of oscillation of half of the value of the voltage corresponding to the surface charge of the paper of approximately three seconds.

The Japanese patent No. JPH11235887 concerns a system of paper and paperboard processing, and binding applied to recycling of books to obtain from the books themselves water-soluble fibre filaments of a thick and strong type or extremely ultrafine type with operations of gluing and melting (obtaining typical fibres used in the binding industry). With the subsequent operations of binding by means of hot pressing, there are solved in an appreciable way the problems of protection of the environment, of the times for processing the fibres themselves, and hence also of the corresponding costs.

BRIEF SUMMARY OF THE INVENTION

The above inventions do not solve other types of problems currently present in the sector. Hence, the present invention, as compared to the known art, is totally innovative in so far as there do not exist so far similar ones, and is likewise inventive in so far as it has been devised for providing a definitive solution to problems that have remained unsolved up to the present day, such as for example:

the problem of providing modulation of the layout constituted by the system of the machines necessary for the specific processes of paper and paperboard processing and binding, rendering it likewise flexible according to the amount and type of operations or personalizations, even of a special type, to be carried out;

the problem of being able to simplify further the above operations or personalizations likewise enabling, simultaneously, a greater control over the production process automatically or on the part of operators;

the problem of being able to obtain a better control of the system especially in the steps of start-up thereof in order to enable optimal start-up regulations; and the problem of making it possible to achieve a control of the entire system via a digital management thereof by means of a console located even remotely.

The main purpose of the present invention is hence to provide an innovative and inventive system that will solve completely said problems that have so far remained unsolved in the prior art.

A further purpose of the present invention is to provide an innovative system that can be integrated in an effective way also on systems of personalized printing, paper and paperboard processing, and binding already existing, which is particularly suitable for creating postal parcels containing objects of various kind, including three-dimensional ones.

A further purpose of the present is to provide an innovative system that is easy to implement, presents high efficiency, and has a minimized cost of application for the specific needs of the customer.

The above purposes are achieved by providing an innovative system for personalized printing, paper and paperboard processing, and binding of a modular type with high flexibility of use and operation according to the claims annexed to the ensuing description and according to what is described in detail hereinafter.

BRIEF DESCRIPTION OF THE DRAWINGS

These purposes and the consequent advantages, as well as the characteristics of the system according to the present invention, will emerge more clearly from the ensuing detailed description of a preferred solution, provided by way of non-limiting example, with reference to the attached drawings, wherein.

DETAILED DESCRIPTION OF THE PREFERRED EMBODIMENTS

Figure 1:
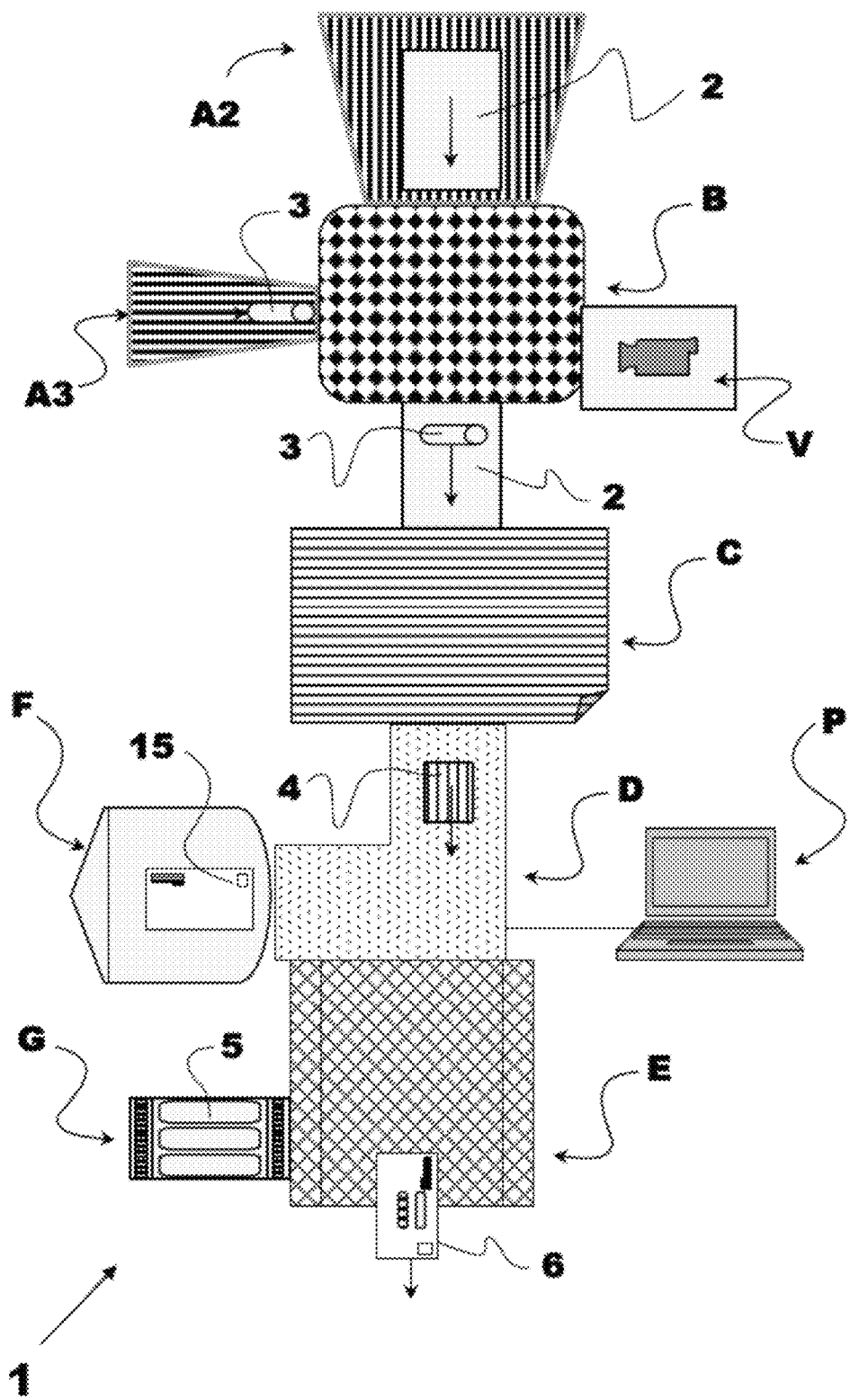
FIG. 1 shows a scheme, provided by way of non-limiting example, of the system 1 devised for personalized printing, paper and paperboard processing, and binding of a modular type with high flexibility of use and operation.
Figure 2:
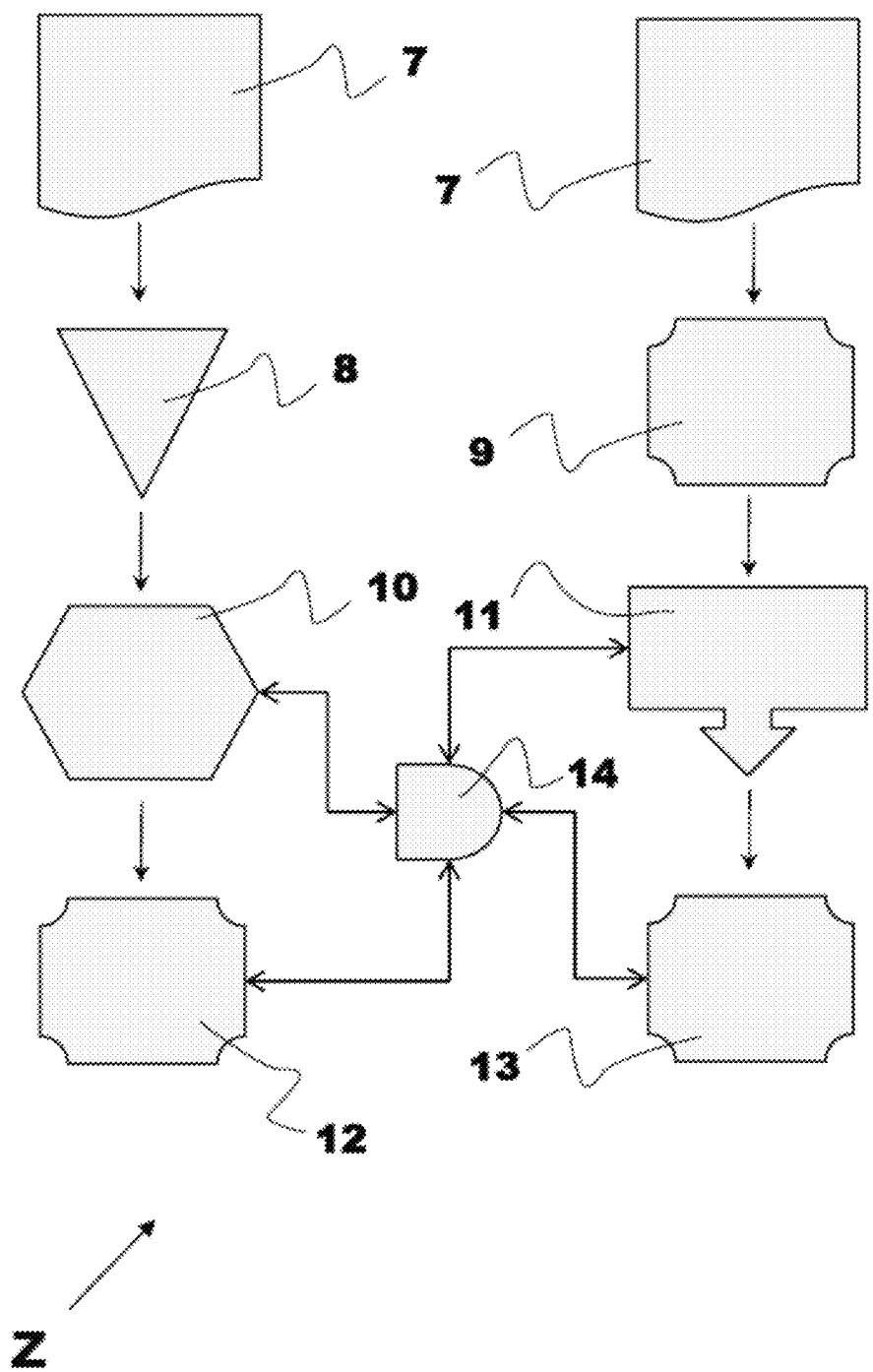
FIG. 2 shows a flowchart Z, provided by way of non-limiting example, of operation of the system 1 devised for personalized printing, paper and paperboard processing, and binding.

From the above FIGS. 1 and 2 attached hereto it may be evinced how the present invention concerns a non-limiting example of a system 1 for personalized printing, paper and paperboard processing, and binding of a modular type with high flexibility of use and operation, basically constituted (FIG. 1) by:

- at least one automatic sheet feeder A2 of the stack or drive-belt type, designed to take up continuously or individually pre-printed sheets 2 and to pre-position at least one sheet 2;
- at least one automatic sheet feeder A3 of the drive-belt type, designed to pre-position the sheet 2 with at least one object 3;
- at least one video-monitoring means B equipped with means V for acquisition of the images of the process;
- at least one folding machine C or folding-gluing machine, which is likewise provided with a working surface, a roller track, and free clamping members for the various devices, a programmer with touch screen, and a plurality of photoelectric cells at input and output, is prearranged for all the types of accessories, such as card applicators, and is designed for carrying out processing operations on a plurality of objects 3, such as cases, CDs, simple and multiple folders, boxes, possibly with bellows, CD covers and envelopes, mailers, two-dimensional or three-dimensional parcels, etc.;
- at least one personalizable machine D designed to carry out particular processes/prints on customer's request;
- at least one sealing machine E;
- at least one folding-and-inserting machine F;
- at least one machine G for applying labels and/or identification means, for example of an RFID type 5; and
- a plurality of further elements, accessories, apparatuses, useful for each specific production process, such as: helix folding assemblies complete with tractors, devices for creating the bellows, V-shaped folding pouches for paper or card with chrome-plated rollers with mobile rubber-coated sectors, freely positionable rods, built-in partial deflectors, automatic loaders 3 for insertion of the products or objects, alignment brackets, tool-holders, outlet collectors (for example of the shingling type), gluers (with possibility of multi-outlet expansion), personalized-printing stations equipped with printing cartridges of various types, and industrial imager readers equipped with a plurality of photoelectric cells.

As may be inferred from the scheme of FIG. 1 the system 1 concerns the logic and functional connection of a plurality of machines, devices and equipment designed to fold, glue, and personalize sheets 2 for making envelopes or postal parcels containing objects 3 to be sent to a plurality of recipients of the print itself (for example also bills, or else membership cards such as credit cards, compact disks, sachets, sample bottles, and many other gadgets).

The system 1 for personalized printing, paper and paperboard processing, and binding also enables insertion of said objects to be sent, with the further possibility of inserting even more than one of them in each envelope or parcel 15.

Characterization of the system 1 is inherent in the fact of having provided "processing stations", namely, the aforementioned machines A2, A3, B, C, D, E, F, G, which afford the possibility of being allocated in the system 1 according to the desired modalities and operating sequence, with the further possibility of adding or removing some of them according to the needs and of their being replaced with further machines different therefrom so as to obtain a system 1 for personalized printing, paper and paperboard processing, and binding that is completely personalizable, namely that affords the possibility of installing or removing, according to the needs, individual machines with the maximum flexibility of use and operation.

Operation of the system 1 for personalized printing, paper and paperboard processing, and binding is likewise possible in all the cases of combination of the individual machines or stations constituting the system. Starting from pre-printed sheets 2 on which further information (personalization) can be printed, on the basis of said personalization the image reader enables insertion of the right object in the corresponding envelope or postal parcel (for example, it provides an effective and efficient solution to the problem of sending a credit card to the person effectively indicated as addressee without any possibility of errors or imprecisions).

The system 1 for personalized printing, paper and paperboard processing, and binding functions in an automated way in so far as it is completely managed by means of an electronic processor P equipped with purposely provided management software 14 (FIGS. 1 and 2) that manages and controls the system 1 itself and the individual various stations or machines A2, A3, B, C, D, E, F, G.

FIG. 2 represents by way of non-limiting example a flowchart of a possible operation of the system 1.

From the aforesaid flowchart of FIG. 2 there may be evinced a non-limiting application exemplifying operation of the system 1. The example envisages a dual starting possibility (I and II), with:

- a first possibility (I) of start 7 of the pre-printed sheet 2 so that it can be checked by a reader 8 on the medium to be inserted into the parcel or on the sheet 2, and then be sent on to the envisaged processing operations 10, whether normal or special, and then undergo a further possible operation of personalization 12 according to the codes read;
- a second possibility (II) of start 7 of the pre-printed sheet 2 so that it can undergo a process of personalization 9 on a paper medium, together with the subsequent operation of insertion 11 of one or more objects 3 into the parcel, and then subsequently with a possible further personalization operation 13, thus obtaining the parcel to be dispatched 6.

A specific management software 14 installed on a processor P enables filing, including remote filing, of all the data regarding the process and control and regulation of the inputs and outputs to/from the system 1 itself.

The fundamental parts in which said system 1 is articulated are constituted by:

- a basic mechanical part;
- at least one optical reader; and
- a plurality of printing heads;

The media, the equipment, the machines or stations, and the devices constituting the mechanical part of the system 1 may be of various types and be allocated at any point of the operating process of the system 1.

The above mechanical part enables, however, installation thereon of other elements useful for the particular production process, as well as insertion of photoelectric cells for controlling the production process through the software 14 of the system 1.

The digital management device P enables interaction with all the elements and accessories of the system 1, thus performing continuous control over the processing operations undergone by the pre-printed sheet 2.

The present system 1 has been devised for enabling implementation of special and mixed operations of paper and paperboard processing, and binding and is characterized by its structure of an open type (which allows the operator maximum simplicity of processing and control) and of a modular type, which likewise presents extreme flexibility, enabling over time replacement of dedicated machines in order to modify the production process itself The modularity of the system 1 is inherent in the fact that its minimal structure of an overall length of less than three metres can be modified and expanded with other elements (arranged even orthogonally with respect to the machines installed in order to carry out other processing operations) as likewise with further devices, including special ones, such as, for example, dispensers of biadhesive tape, gumming devices, feeders of semi-finished products and cards, ink-jet personalization systems, etc.

The automatic sheet feeders A2-A3 may be of various types as regards the material and the format of the paper of the pre-printed sheet 2. For example, they may be of the plane-stack type for large formats, of the drive-belt type for paper processing, with continuous feed or with feed variable in an alternating way, or again of the "quire" type, the latter being equipped at the bottom with a purposely provided suction belt.

A further characterization of the system 1 is its flexibility, namely the possibility of working in stand-alone mode or else inserted between the stations of a folding machine, or again in combination with a creasing machine, or else again in a mailing line.

The system 1 also presents a possibility of movement of a reciprocating type, enabling, under automatic management control, starting of the process also in reverse order to enable the useful start-up adjustments of the production process itself.

No other system of the ones so far known similar to the one according to the present invention currently manages to achieve the same result as those achieved by the present system 1.

The basic advantages of the present system are listed below:
  extreme ease of design of the system 1 according to the customer's requirements;
  extreme ease of installation of the system 1 also on pre-existing machines and stations at the customer's own production premises;
  extreme flexibility of adaptation of the system 1 to possible needs and requirements subsequent to the design order or to unexpected or unlikely events;
  extreme modularity of the system 1 represented by the possibility of extending it or reducing it according to the production requirements;
  maximized simplicity of operation by means of control via operator; and
  possibility of automatic control of the process also remotely via PLC.

The present system hence presents the indisputable advantage of solving all the problems linked to the systems according to prior art.

A further advantage of the present system over known systems is its minimized cost of implementation and installation for the end user.

Another undeniable advantage is linked to the fact that with the present invention the possibilities of use thereof even in the future, with the advent of new technologies, are widened considerably and in an advantageous way.

It should be noted that, for the purposes of the present invention, printing of the personalization envisages, by way of non-limiting example, printing of: names, addresses, alphanumeric codes, codes of various types (QR codes, barcodes, data matrices, etc.).

It is also evident that the example of embodiment previously described by way of illustrative and non-limiting example may undergo numerous modifications, adaptations, integrations, variations, and substitutions of elements with other functionally equivalent ones, without thereby departing from the sphere of protection of the ensuing claims.

LEGEND

1. SYSTEM FOR PERSONALIZED PRINTING, PAPER AND PAPERBOARD PROCESSING, AND BINDING OF A MODULAR TYPE WITH HIGH FLEXIBILITY OF USE AND OPERATION
2. PRE-PRINTED SHEET
3. SHEET WITH POSSIBLE ATTACHED OBJECT/OBJECTS
4. FOLDED OBJECT/OBJECTS AND SHEET
5. LABELS AND/OR RFID TAGS
6. OBJECT/OBJECTS AND SHEET FOLDED IN AN ENVELOPE OR PARCEL 15 WITH LABELS AND/OR RFID TAGS
7. START OF THE PRE-PRINTED SHEET
8. READER ON A MEDIUM TO BE INSERTED OR ON THE SHEET
9. PERSONALIZATION ON A PAPER MEDIUM
10. NORMAL OR SPECIAL OPERATIONS
11. INSERTION OF OBJECT/OBJECTS
12. PERSONALIZATION/PERSONALIZED PRINTING CORRESPONDING TO CODES READ
13. POSSIBLE FURTHER PERSONALIZATION/PERSONALIZED PRINTING
14. MANAGEMENT SOFTWARE
15. ENVELOPE (OR PARCEL) COMPLETE WITH ADDRESSES OF SENDER AND RECIPIENT
A2 AUTOMATIC SHEET FEEDER FOR PRE-POSITIONING THE SHEET 2
A3 AUTOMATIC SHEET FEEDER FOR PRE-POSITIONING THE SHEET 2 AND AT LEAST ONE OBJECT 3
B VIDEO-MONITORING MEANS
C FOLDING MACHINE
D PERSONALIZABLE MACHINE DESIGNED TO CARRY OUT PARTICULAR OPERATIONS/PRINTS ON CUSTOMER'S REQUEST
E SEALING MACHINE
F FOLDING-AND-INSERTING MACHINE
G LABELLING MACHINE AND/OR RFID-APPLICATING MACHINE
P ELECTRONIC PROCESSOR EQUIPPED WITH PURPOSELY PROVIDED SOFTWARE 14
Z FLOWCHART OF OPERATION OF THE SYSTEM
I, II DUAL STARTING POSSIBILITY

The invention claimed is:
1. A system (1) for personalized printing, paper and paperboard processing, and binding, to enable automatic management of simple, special, and mixed operations of paper and paperboard processing and binding, the system comprising:

modular manufacturing machines and modular processing stations (A2, A3, B, C, D, E, F, G) insertable into said system (1) by allocating the modular manufacturing machines and the module processing stations into the system according to desired modalities, number, and operating sequence, wherein the modular manufacturing machines and the module processing stations are replaceable with further modular machines different therefrom so as to obtain the personalized system (1) for personalized printing, paper and paperboard processing, and binding that is personalizable, with flexibility of use and operation according to needs at a moment of production of a present process, the modular manufacturing machines and the module processing stations including:

at least one automatic stack sheet feeder (A2) designed to take up pre-printed sheets (2) and to pre-position at least one sheet (2) of the pre-printed sheets (2);

at least one automatic sheet feeder (A3) designed to pre-position the at least one sheet (2) with at least one object (3);

at least one video-monitoring means (B) equipped with means (V) for acquisition of images of the present process;

at least one folding machine (C) which is provided with a working surface that is prearranged for accessories, including card applicators, and is designed for carrying out processing operations on a plurality of the objects (3), including objects selected from the group consisting of CDs, simple folders, multiple folders, boxes without bellows, boxes with bellows, CD covers, CD envelopes, mailers, two-dimensional parcels, and three-dimensional parcels;

at least one personalizable machine (D) designed to carry out particular processes/prints on customer's request;

at least one sealing machine (E);

at least one folding-and-inserting machine (F);

at least one application machine (G) for applying at least one of labels and identification means; and a plurality of further elements, accessories, and apparatuses, each of the plurality of further elements, accessories, and apparatuses being useful for a different specific production process.

2. The system (1) for personalized printing, paper and paperboard processing, and binding according to claim 1, wherein said system (1) functions in automated mode and can be managed locally or remotely by an electronic processor (P) equipped with purposely provided management software (14) designed to manage and control the system (1) itself, together with the modular manufacturing machines and the module processing stations that make up the system.

3. The system (1) for personalized printing, paper and paperboard processing, and binding according to claim 2, wherein said system (1) enables insertion of said objects (3) to be sent in a number greater than one for each package envelope (15), or postal parcel.

4. The system (1) for personalized printing, paper and paperboard processing, and binding according to claim 1, wherein said system (1) is designed for logic and functional connection of a plurality of machines, devices, and equipment designed to fold, glue, and print sheets (2) for making package envelopes or postal parcels containing objects (3) to be sent to a plurality of recipients of the prints themselves, including bills, membership cards, credit cards, compact disks, sachets, and sample bottles.

5. The system (1) for personalized printing, paper and paperboard processing, and binding according to claim 4, wherein said system (1) enables insertion of said objects (3) to be sent in a number greater than one for each package envelope (15), or postal parcel.

6. The system (1) for personalized printing, paper and paperboard processing, and binding according to claim 1, wherein said system (1) enables insertion of said objects (3) to be sent in a number greater than one for each package envelope (15), or postal parcel.

7. The system (1) for personalized printing, paper and paperboard processing, and binding according to claim 1, wherein operation of the system (1) for personalized printing, paper and paperboard processing, and binding is possible in all combinations of the individual modular manufacturing machines and the module processing stations (A2, A3, B, C, D, E, F, G) that make up the system.

8. The system (1) for personalized printing, paper and paperboard processing, and binding according to claim 7, wherein the at least one automatic stack sheet feeder (A2) and the at least one automatic sheet feeder (A3) include plural automatic stack sheet feeders (A2) and plural automatic sheet feeders (A3) that each handle a respective one of different material and format paper of the pre-printed sheet (2).

9. The system (1) for personalized printing, paper and paperboard processing, and binding according to claim 1, wherein operation of said system (1) provides for a dual starting operation (I and II), with:

a first starting operation (I) of the pre-printed sheet (2) so that the pre-printed sheet (2) is checked by a reader (8) of the medium to be inserted into the parcel or on the sheet (2), and then be sent on to the envisaged processing operations (10), whether normal or special, and then undergo a further operation of personalization (12) according to the codes read; and a second starting operation (II) of the pre-printed sheet (2) so that the pre-printed sheet (2) can undergo a process of personalization (9) on a paper medium, together with the subsequent operation of insertion (11) of one or more objects (3) into the parcel, and then subsequently with a further personalization operation (13), thus obtaining the parcel to be dispatched (6).

10. The system (1) for personalized printing, paper and paperboard processing, and binding according to claim 1, wherein a specific management software (14) installed on a digital management device or processor (P) enables filing, including remote filing, of all the data regarding the process and control and regulation of the inputs and outputs to/from the system (1) itself.

11. The system (1) for personalized printing, paper and paperboard processing, and binding according to claim 10, wherein a plurality of photoelectric cells control the particular production process of the system (1) through the management, regulation, and control software (14).

12. The system (1) for personalized printing, paper and paperboard processing, and binding according to claim 10, wherein the digital management device or processor (P) enables via said software (14) interaction with all the elements and the accessories of the system (1), thus performing continuous control of the processing operations undergone by the pre-printed sheet (2).

13. The system (1) for personalized printing, paper and paperboard processing, and binding according to claim 1, wherein the system carries out special and mixed operations of paper and paperboard processing, and binding via its structure an open structure allowing the operator simplicity of processing and control.

14. The system (1) for personalized printing, paper and paperboard processing, and binding according to claim 1, wherein the system is configurable to carry out special and mixed operations of paper and paperboard processing, and binding via the system's structure being modular enabling over time replacement of dedicated machines and modification of the production process itself.

15. The system (1) for personalized printing, paper and paperboard processing, and binding according to claim 1, wherein said modularity of the system (1) includes the system's assigned overall length being modifiable and expandable including by inclusion of other elements being arranged orthogonally with respect to the modular manufacturing machines and the module processing stations installed in order to carry out other processes and the system being modifiable by inclusion of further special-purpose devices.

16. The system (1) for personalized printing, paper and paperboard processing, and binding according to claim 1, wherein the system is capable of working in both a stand-alone mode and in a mode inserted between stations in a mailing line.

17. The system (1) for personalized printing, paper and paperboard processing, and binding according to claim 1, wherein the system presents reciprocating movement, enabling, under automatic management control, starting of the process also in reverse order to enable the useful start-up adjustments of the production process itself of the system (1).

18. The system (1) for personalized printing, paper and paperboard processing, and binding according to claim 1, wherein said at least one application machine (G) is configured for applying RFID identification tags.

19. The system (1) for personalized printing, paper and paperboard processing, and binding according to claim 1, wherein the at least one folding machine (C) is a folding-gluing machine.

* * * * *